United States Patent
Xu et al.

(10) Patent No.: US 9,877,189 B2
(45) Date of Patent: Jan. 23, 2018

(54) VERIFICATION METHOD AND DEVICE USING A MAGNETOMETER

(71) Applicant: ALIBABA GROUP HOLDING LIMITED, George Town, Grand Cayman (KY)

(72) Inventors: Mingxing Xu, Hangzhou (CN); Chaofeng Meng, Hangzhou (CN); Yan Xia, Hangzhou (CN); Bin Fang, Hangzhou (CN); Lei Wang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 8 days.

(21) Appl. No.: 14/677,720

(22) Filed: Apr. 2, 2015

(65) Prior Publication Data

US 2015/0304845 A1 Oct. 22, 2015

(30) Foreign Application Priority Data

Apr. 21, 2014 (CN) .......................... 2014 1 0160839

(51) Int. Cl.
*H04Q 7/10* (2006.01)
*H04W 12/06* (2009.01)
(Continued)

(52) U.S. Cl.
CPC ............ *H04W 12/06* (2013.01); *G06F 21/36* (2013.01); *H04W 4/026* (2013.01); *H04W 12/08* (2013.01); *G06F 2221/2133* (2013.01)

(58) Field of Classification Search
CPC ......... G06F 21/31; G06F 21/36; G06Q 20/40; G06Q 20/42; G06Q 20/10; H04W 12/06; H04W 12/08; G01C 17/02
(Continued)

(56) References Cited

U.S. PATENT DOCUMENTS 8,380,177 B2  2/2013  Laracey
8,430,310 B1  4/2013  Ho et al.
(Continued)

FOREIGN PATENT DOCUMENTS

EP   2624159 A1   8/2013
EP   2631834 A1   8/2013
(Continued)

OTHER PUBLICATIONS

PCT International Search Report and Written Opinion dated Jul. 1, 2015, issued in corresponding International Application No. PCT/US2015/024130 (12 pages).
(Continued)

*Primary Examiner* — Kathy Wang-Hurst
*Assistant Examiner* — Julio Perez
(74) *Attorney, Agent, or Firm* — Finnegan, Henderson, Farabow, Garrett & Dunner LLP

(57) ABSTRACT

A method for verifying a user of a mobile device is provided. The method includes selecting a numerical value and generating a direction image based on the numerical value. The direction image may indicate a first position on the direction image and a second position on the mobile device when the direction image is initially displayed on the mobile device. The direction image may have a center point and the numerical value may correspond a central angle between the first position and the second position. The method may further include sending, to the mobile device, the direction image and a command to rotate the mobile device according to the direction image and receiving a magnetometric numerical value detected by the mobile device using a magnetometer. The method may further include determining whether to allow access of a server by the user based on the magnetometric numerical value.

27 Claims, 7 Drawing Sheets

(51) Int. Cl.
*H04W 12/08* (2009.01)
*H04W 4/02* (2009.01)
*G06F 21/36* (2013.01)

(58) Field of Classification Search
USPC .............. 455/410–411; 726/4, 5, 21; 705/44
See application file for complete search history.

(56) References Cited

U.S. PATENT DOCUMENTS

| | | | |
|---|---|---|---|
| 8,542,251 | B1 | 9/2013 | Gossweiler, III et al. |
| 8,752,200 | B2 | 6/2014 | Varshavsky et al. |
| 8,842,888 | B2 | 9/2014 | Pritikin et al. |
| 9,048,923 | B2 | 6/2015 | Molettiere et al. |
| 2012/0276958 | A1* | 11/2012 | Inami ................ H04M 1/0237 455/566 |
| 2013/0006573 | A1 | 1/2013 | Brunner et al. |
| 2013/0218775 | A1* | 8/2013 | Dabosville ............ G06Q 20/40 705/44 |
| 2014/0082694 | A1 | 3/2014 | Sanghavi |
| 2014/0184505 | A1 | 7/2014 | Fullerton et al. |
| 2014/0201120 | A1 | 7/2014 | Lydon et al. |
| 2014/0279493 | A1* | 9/2014 | Kamath ................ H04L 63/08 705/43 |
| 2014/0281523 | A1 | 9/2014 | Golino |
| 2014/0375573 | A1 | 12/2014 | Idzik et al. |

FOREIGN PATENT DOCUMENTS

| | | |
|---|---|---|
| EP | 2858049 A2 | 4/2015 |
| WO | WO 2012/008512 A2 | 6/2012 |
| WO | WO 2015/062425 A1 | 5/2015 |

OTHER PUBLICATIONS

Tao Peng et al., "*Investigating Mobile Device Picking-Up Motion as a Novel Biometric Modality*," 2013 IEEE Sixth Int'l Conference on Biometrics: Theory, Application and Systems (BTAS), Sep. 29, 2013-Oct. 2, 2013 (6 pgs.).

Hamed Ketabdar et al., "*Magnetic Signatures in Air for Mobile Devices*," MobileHCI'12 Proceedings of the 14$^{th}$ Int'l Conference on Human-Computer Interaction with Mobile Devices and Services Companion, Sep. 21, 2012 (4 pgs.)

* cited by examiner

VERIFICATION METHOD AND DEVICE USING A MAGNETOMETER

CROSS-REFERENCE TO RELATED APPLICATION

This application is based upon and claims priority to Chinese Patent Application No. 201410160839.1, filed Apr. 21, 2014, the entire contents of which are incorporated herein by reference.

TECHNICAL FIELD

The present disclosure generally relates to the field of communication technology and, more particularly, to a verification method and device using a magnetometer.

BACKGROUND

Application programs often use verification codes to identify whether information, such as usernames and passwords, is inputted by legitimate users, or by attackers using a computer in continuous attempts to crack a legitimate user's username and password. A verification code may include random characters displayed to a user in an image, which the user then enters. Alternatively, a verification code may include a question displayed to a user in an image, and a user can enter the answer to the question. Since attackers are unable to enter the correct information by computer, verification codes may be used to distinguish whether the information entered is from legitimate users or attackers.

In the conventional technology, verification codes may be made more secure by adding visual noise and distortion to the random characters or increasing the difficulty of the questions. However, employing these measures often has a negative effect on the user experience, as the random characters or questions may be difficult for legitimate users to distinguish or answer. Particularly for mobile device users, due to the fact that inputting information on mobile devices is less easy, user experience is negatively impacted by the conventional verification measures.

SUMMARY

The present disclosure provides a method for verifying a user of a mobile device. Consistent with some embodiments, the method includes selecting a numerical value and generating a direction image based on the numerical value. The direction image may be configured to indicate a first position on the direction image and a second position on the mobile device when the direction image is initially displayed on the mobile device. The direction image may have a center point and the numerical value may correspond a central angle between the first position and the second position. The method may further include sending, to the mobile device, the direction image and a command or instruction for the user to rotate the mobile device according to the direction image and receiving a magnetometric numerical value from the mobile device. The magnetometric numerical value is detected by the mobile device using a magnetometer. The method may further include determining whether to allow access of a server by the user based on the magnetometric numerical value.

According to some embodiments, the second position is aligned with a North Magnetic Pole detected by a magnetometer of the mobile device when the direction image is initially displayed on the mobile device. The direction image may have a reference point configured to align with a North Magnetic Pole detected by the magnetometer of the mobile device when the direction image is initially displayed on the mobile device, and the second position is aligned with the reference point when the direction image is initially displayed on the mobile device. According to some embodiments, the magnetometric numerical value is detected by the mobile device when the first position is aligned with the second position.

Consistent with some embodiments, this disclosure further provides a method for verifying a user of a mobile device. The method includes receiving, from a server, a direction image and a command for the user to rotate the mobile device. The direction image may be configured to indicate a first position on the direction image and a second position on the mobile device when the direction image is initially displayed on the mobile device. The direction image may have a center point and the numerical value may correspond to a central angle between the first position and the second position. The method may further include rotating the direction image in response to a rotation of the mobile device by the user such that the direction image stays substantially stationary relative to a North Magnetic Pole detected by a magnetometer of the mobile device during the rotation. The method may further include receiving a command to stop rotating the mobile device and detecting, using the magnetometer, a magnetometric numerical value associated with the mobile device, and sending the magnetometric numerical value to the server.

According to some embodiments, when the command to stop rotating the mobile device is received, the first position indicated on the rotated direction image aligns with the second position. In some embodiments, the second position is aligned with a North Magnetic Pole detected by the magnetometer of the mobile device when the direction image is initially displayed on the mobile device. The direction image may have a reference point configured to align with the North Magnetic Pole detected by the magnetometer of the mobile device when the direction image is initially displayed on the mobile device, and the second position is aligned with the reference point when the direction image is initially displayed on the mobile device. The method may further include performing calibration of the magnetometer of the mobile device. The initial display of the direction image on the mobile device may be the display after the calibration.

Consistent with some embodiments, this disclosure provides a device for verifying a user of a mobile device. The device includes a selection module configured to select a numerical value and a generating module configured to generate a direction image based on the numerical value. The direction image may be configured to indicate a first position on the direction image and a second position on the mobile device when the mobile device initially displays the direction image. The direction image may have a center point and the numerical value may correspond to a central angle between the first position and the second position. The device may further include a sending module configured to send, to the mobile device, the direction image and a command for the user to rotate the mobile device and a receiving module configured to receive a magnetometric numerical value from the mobile device. The magnetometric numerical value is detected by the mobile device using a magnetometer. The device may further include a verifying module configured to determine whether to allow access of a server by the user based on the magnetometric numerical value.

Consistent with some embodiments, this disclosure provides a device for verifying a user of a mobile device. The device includes a receiving module configured to receive, from a server, a direction image and a command for the user to rotate the mobile device. The direction image may be configured to indicate a first position on the direction image and a second position on the mobile device when the direction image is initially displayed on the mobile device. The direction image may have a center point and the numerical value may correspond to a central angle between the first position and the second position. The device may further include a processing module configured to: rotate the direction image in response to a rotation of the mobile device by the user such that the direction image stays substantially stationary relative to a North Magnetic Pole detected by a magnetometer of the mobile device, receive a command to stop rotating the mobile device, and detect, using the magnetometer, a magnetometric numerical value associated with the mobile device. The device may further include a sending module configured to send the magnetometric numerical value to the server.

Consistent with some embodiments, this disclosure provides a method for verifying a user of a mobile device. The method includes receiving, from a server, an instruction to rotate the mobile device an angle; rotating the mobile device according to the instruction; detecting a magnetometric numerical value of the mobile device relative to a reference point of the magnetic field of the Earth by a magnetometer of the mobile device; and sending the detected magnetometric numerical value to the server. In some embodiments, the reference point of the magnetic field of the Earth is a North Magnetic Pole detected by the magnetometer of the mobile device.

Consistent with some embodiments, this disclosure provides a method for verifying a user of a mobile device. The method includes sending, to the mobile device, a command for the user to rotate the mobile device an angle, receiving information indicating a magnetometric numerical value of the mobile device relative to a reference point of the magnetic field of the Earth detected by a magnetometer of the mobile device, and determining whether to allow access of a server by the user based on the magnetometric numerical value. In some embodiments, the reference point of the magnetic field of the Earth is a North Magnetic Pole detected by the magnetometer of the mobile device.

Consistent with some other embodiments, this disclosure provides a method for verifying a user of a mobile device. The method for verifying a user of a mobile device may include sending, to the mobile device, a direction image having a center point and a first position and an instruction for the user to rotate the mobile device to align the first position with a second position on the mobile device, receiving information indicating a magnetometric numerical value of the mobile device relative to a reference point of the magnetic field of the Earth detected by the magnetometer of the mobile device, and determining whether to allow access of a server by the user based on the magnetometric numerical value. In some embodiments, the reference point of the magnetic field of the Earth is a North Magnetic Pole detected by the magnetometer of the mobile device. In some embodiments, the direction image may include a reference point, which is configured to be aligned with the second position of the mobile device when the direction image is initially displayed on the mobile device. In some embodiments, the second position is a front end of the mobile device.

Additional objects and advantages of the disclosed embodiments will be set forth in part in the description which follows, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
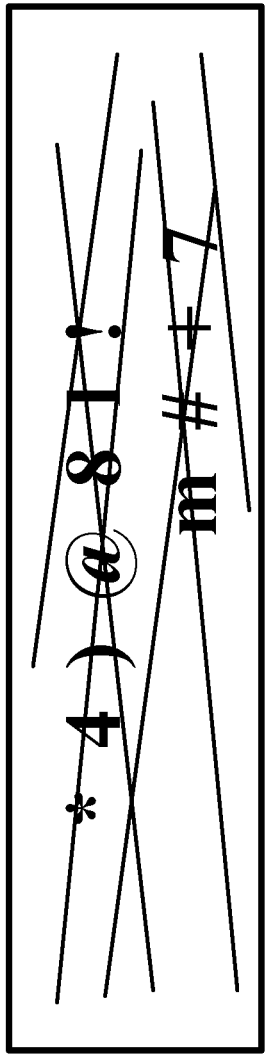
FIG. 1 is a schematic diagram showing a verification code with added visual noise and distorted lettering.

FIG. 1 is a schematic diagram showing a verification code 100 with added visual noise and distorted lettering. As shown in FIG. 1, the verification code 100 includes addition of visual noise to the random characters and distorted lettering. When visual noise and distorted lettering are used, it is often difficult for legitimate users to identify the characters in the verification code 100.

Figure 2:
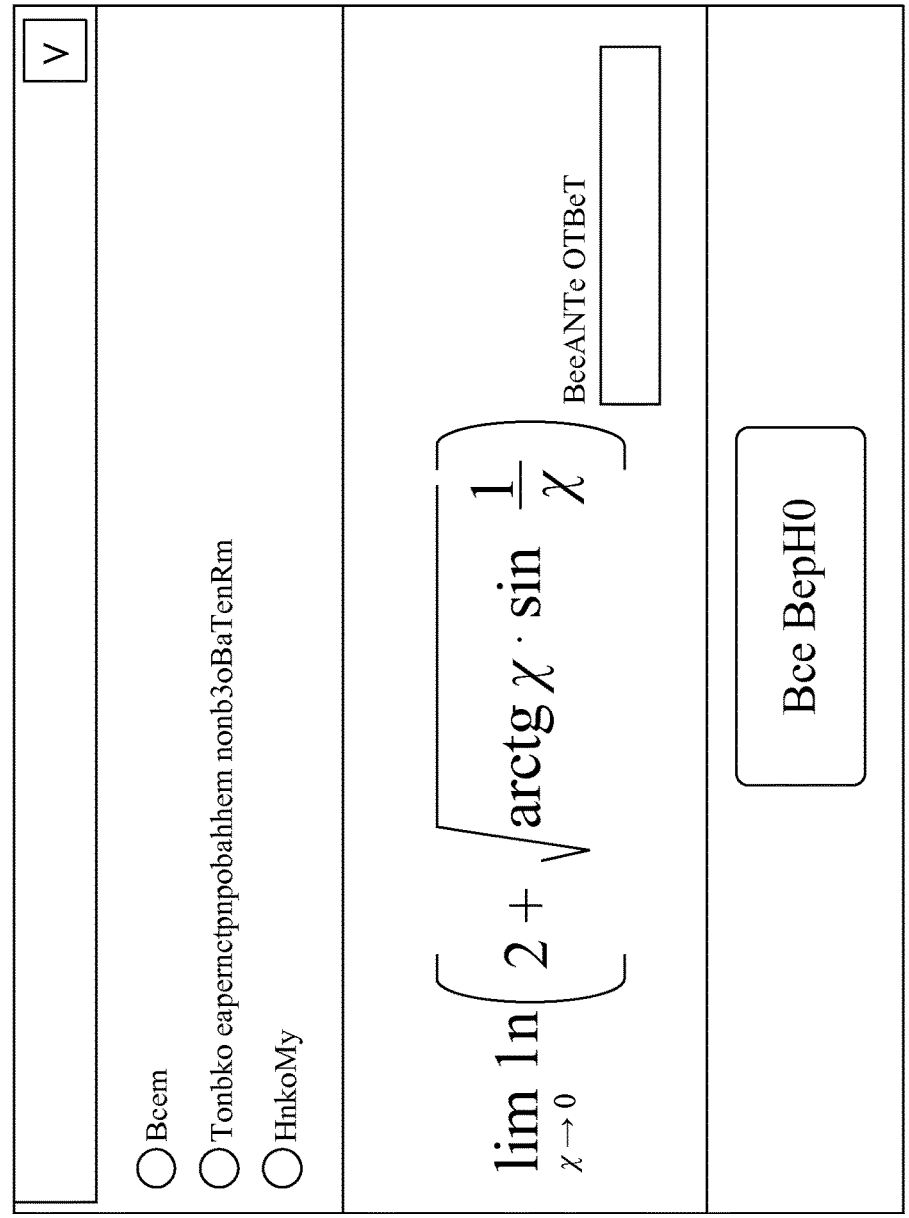
FIG. 2 is a schematic diagram showing a verification code with a question.

FIG. 2 is a schematic diagram showing a verification code 200 with a question. As shown in FIG. 2, the verification code 200 includes a mathematical question, and legitimate users may not know the answer to the question.

As described above, the conventional technology of adding visual noises, using distorted letters, or increasing the difficulties of questions, may result in a degradation of user experience. It is thus desired to prevent information cracking with technologies that have less of negative effect on user experience.

Consistent with some embodiments of this disclosure, a verification method using a magnetometer is provided. The method is applicable to systems including a mobile device and a server. The mobile device may communicate to the server via a network to perform operations provided by this disclosure. For example, the mobile device may be a smart phone or a tablet computer equipped with a magnetometer, such as a magnetometric sensor. An application program in the mobile device may utilize the magnetometer to ascertain a magnetometric numerical angle between a specified position of the mobile device (such as the front end of the mobile device) and a reference point of the magnetic field of the Earth, such as the North Magnetic Pole detected by the magnetometer of the mobile device, which is also known as the Geographic North Pole.

Figure 3:
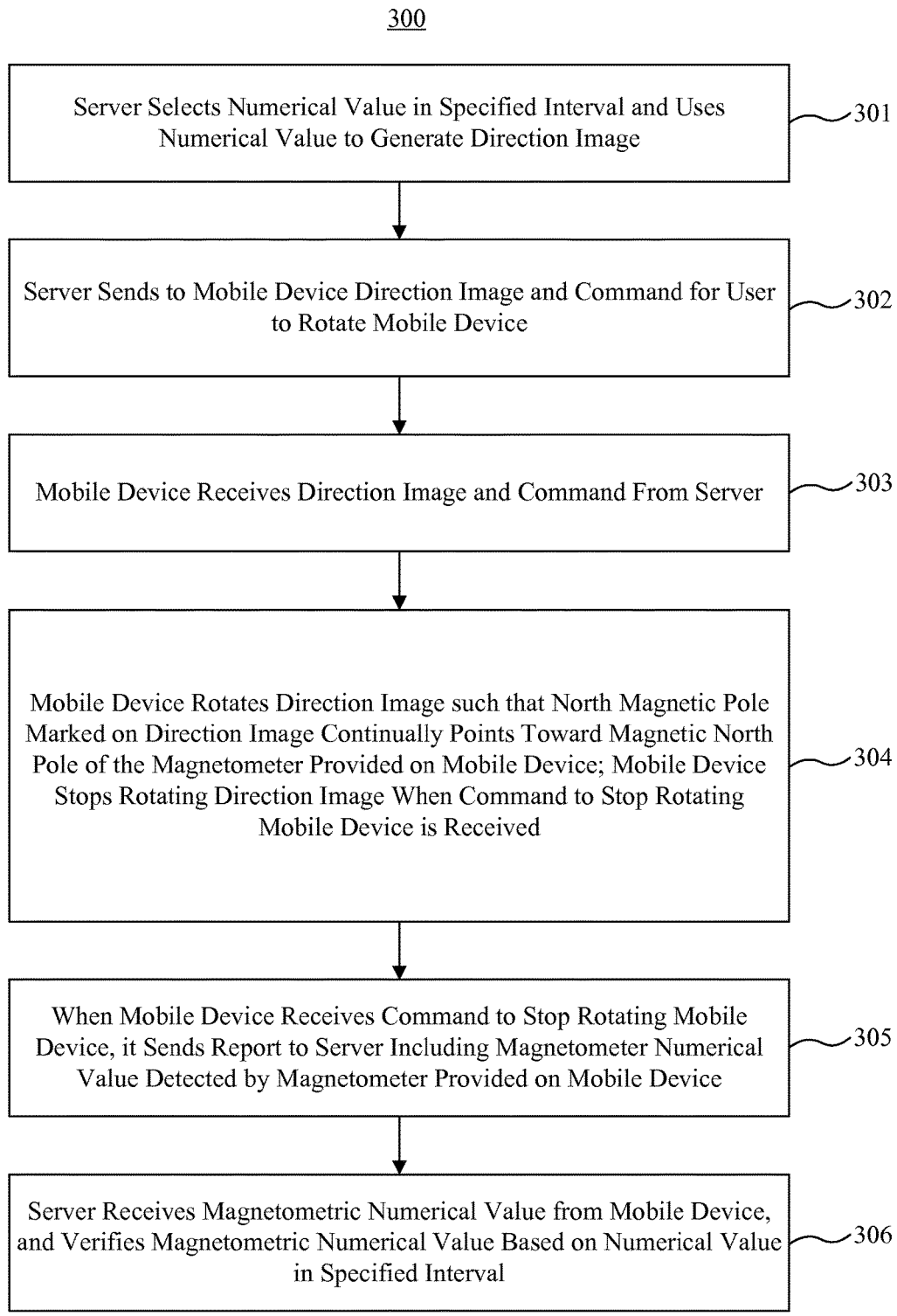
FIG. 3 is a flowchart of an exemplary verification method using a magnetometer, consistent with some embodiments of this disclosure.

FIG. 3 is a flowchart of an exemplary verification method 300 using a magnetometer, consistent with some embodiments of this disclosure. In the verification method 300, it is not necessary for the server to send random characters or questions to the mobile device for identifying whether the information is entered by a legitimate user or an attacker. Instead, the server selects or generates a numerical value. In some embodiments, the numerical value can be within a specified interval. The server can send the numerical value to the mobile device. In some embodiments, the server can use the numerical value to generate a direction image and send the direction image to the mobile device. The server may also send a command or instruction for the user to rotate the mobile device. For example, the server may send the direction image and the command for the user to rotate the mobile device to a client-side application installed on the mobile device.

Referring to FIG. 3, the verification method 300 includes the following steps.

In step 301, the server selects a numerical value in a specified interval, and uses the numerical value to generate a direction image.

In some embodiments, the server may randomly generate a numerical value within a specified interval. For example, the specified interval may be set from 0 to 360, and the numerical value may be a numerical value between 0 and 360.

In some embodiments, the direction image may have a center point and the numerical value within the specified interval may be associated with a central angle formed by a marked position (can also be called a first position) and a specified position (can also be called a second position). The marked position may be indicated on the direction image. The direction image may have a reference point, which points to the specified position on the mobile device when the direction image is initially displayed on the mobile device. The initial display can be the display after the mobile device is ready to start the verification process, such as after the mobile device calibrating the magnetometer or settling down with a position, but not necessarily to be the first appearance. The central angle may be formed by the marked position moving in a clockwise or a counter-clockwise direction towards the specified position.

In some embodiments, the reference point on the direction image is used to indicate the North Magnetic Pole when the direction image is displayed on the mobile device. The specified position is also aligned with the North Magnetic Pole when the direction image is displayed on the mobile device. The North Magnetic Pole refers to the North Magnetic Pole detected by the magnetometer of the mobile device. The numerical value represents the degree of the central angle between the marked position and the North Magnetic Pole, in either a clockwise or a counter-clockwise direction.

Based on the direction image, the user may rotate the mobile device such that the marked position aligns with the specified position on the mobile device.

Figure 4:
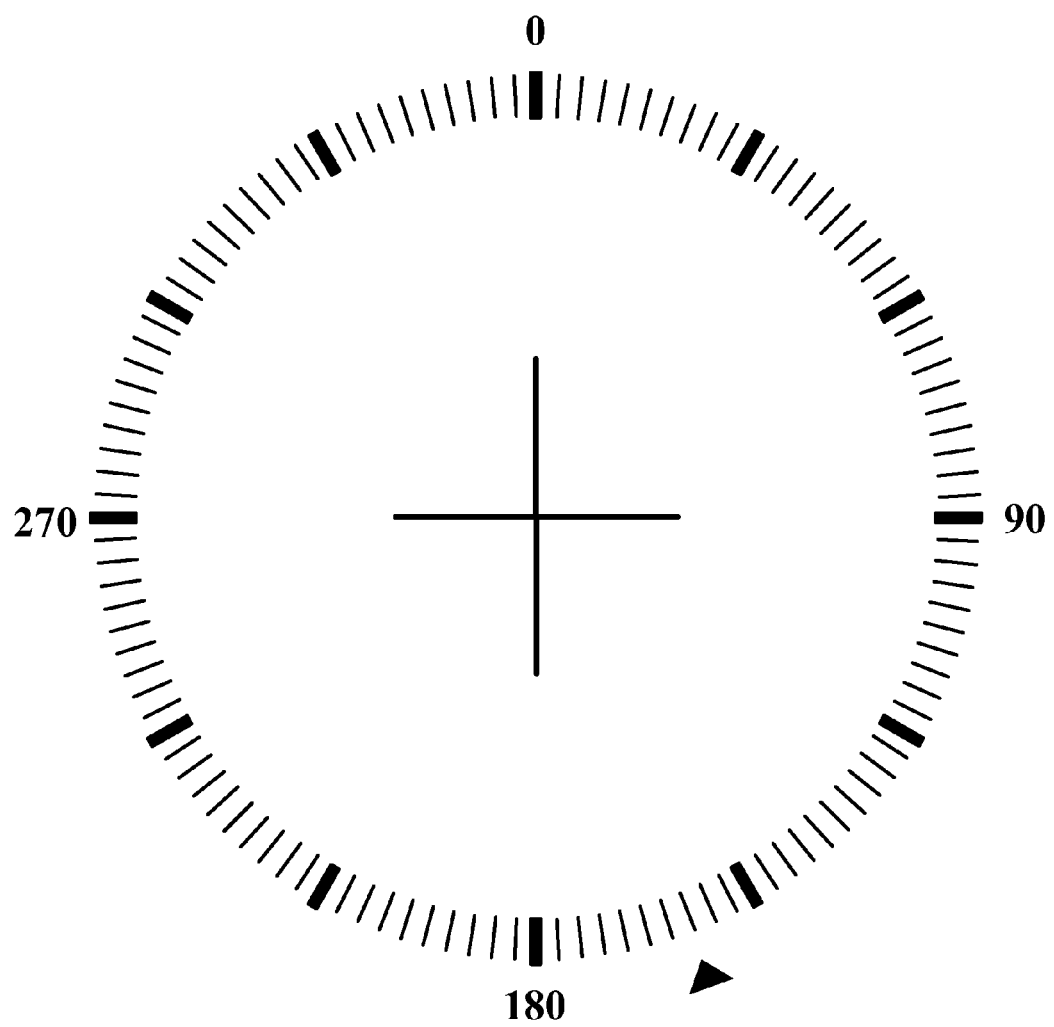
FIG. 4 is a schematic diagram illustrating an exemplary direction image, consistent with some embodiments of this disclosure.

FIG. 4 is a schematic diagram illustrating an exemplary direction image 400, consistent with some embodiments of this disclosure. In this example, the numerical value randomly generated by the server is 159 (the angle from "0" to the small black triangle). As shown FIG. 4, the small black triangle is used to mark the marked position. The number 0 in FIG. 4 may be the reference point on the direction image. In some embodiments, the number 0 points to a position on the mobile device when the direction image is initially displayed on the mobile device. That position can be considered as the specified position. In some embodiments, the direction image can be configured to have the number 0 point to the North Magnetic Pole. In some embodiments, the user can initially set up the mobile device to align the front end of the mobile device with the number 0 and the North Magnetic Pole. In this case, the front end of the mobile device is the specified position. It can be seen from FIG. 4, that the central angle formed by the marked position (i.e., the position of the small black triangle) on the direction image and the North Magnetic Pole (i.e., number 0) is of 159 degrees.

In some embodiments, the server may add visual noise in the direction image during the process of generating the direction image such that it would be more difficult for attackers to identify the content of the direction image by computer automation.

In step 302, the server sends the direction image to a mobile device. The server may also send to the mobile device a command for a user to rotate the mobile device.

In step 303, the mobile device receives the direction image and the command for the user to rotate the mobile device from the server. For example, the mobile device may receive the direction image 400 shown in FIG. 4, on which a marked position (e.g., the small black triangle) and the North Magnetic Pole (e.g., number 0) may be shown.

The user may rotate the mobile device according to the command or instruction. In response to the rotation of the mobile device by the user, the mobile device rotates the direction image in a direction such that the North Magnetic Pole (e.g., number 0) marked on the rotated direction image continuously points toward the North Magnetic Pole detected by the magnetometer on the mobile device, as shown in step 304. The user may stop rotating the mobile device when the marked position on the rotated direction image aligns with the specified position (the initial position indicated by the North Magnetic Pole (e.g., number 0) on the direction image on the mobile device before the rotation). In other words, during the rotation, the direction image keeps stationary relative to the North Magnetic Pole or the Earth's magnetic field. The user rotates the mobile device such that the specified position on the mobile device which originally corresponds to "0" to correspond to the marked position on the direction image. Subsequently, the mobile device may determine that a command from the user to stop rotating the mobile device is received, and correspondingly, stop rotating the direction image.

The mobile device may activate the magnetometer on the mobile device when the mobile device receives the direction image, and then the user may rotate the mobile device. While the user is rotating the mobile device, the mobile device may determine that a command from the user to rotate the mobile device is received, and the client-side application on the mobile device may automatically rotate the direction image received from the server based on this command such that the North Magnetic Pole marked on the rotated direction image continually points toward the North Magnetic Pole of the magnetometer provided on the mobile device.

Figure 5:
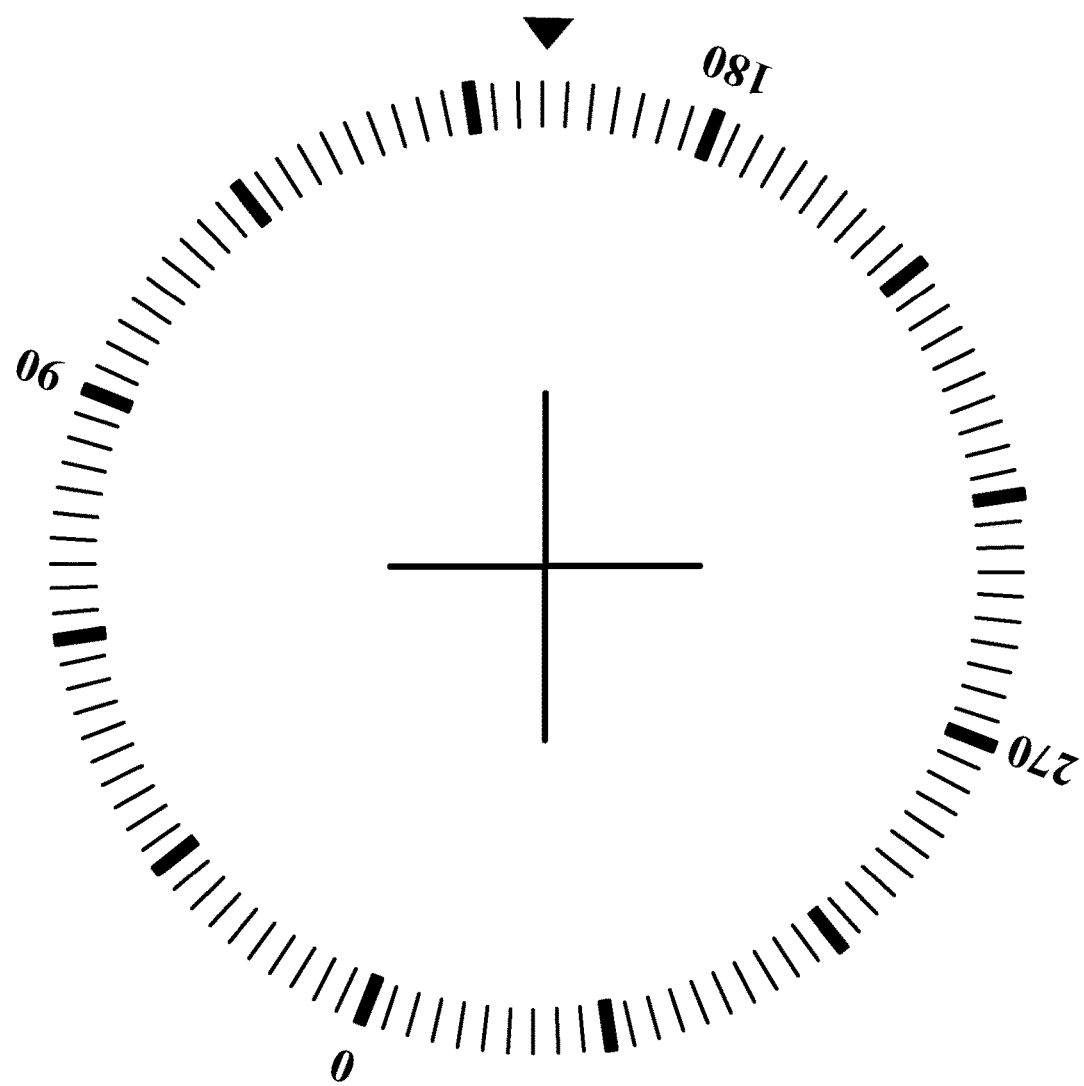
FIG. 5 is a schematic diagram illustrating an exemplary rotated direction image, consistent with some embodiments of this disclosure.

FIG. 5 is a schematic diagram illustrating an exemplary rotated direction image 500, consistent with some embodiments of this disclosure. In the process of rotating the mobile device, when the marked position on the direction image is aligned with the specified position on the mobile device indicated by the direction image before the rotation, the user may stop rotating the mobile device. As shown in FIG. 5, in the rotated direction image 500, the marked position, i.e., the position indicated by the small black triangle, is aligned with the specified position. Consequently, the user may stop rotating the mobile device when the direction image is rotated to the target position as shown in the rotated direction image 500. In some embodiments, once the user has stopped rotating the mobile device, the mobile device may determine that a command is received from the user to stop rotating the mobile device.

In some embodiments, since magnetometers are prone to deviation, the mobile device may prompt the user to calibrate the magnetometer before rotating the direction image. For example, the mobile device may receive a command from the user to calibrate the magnetometer and perform calibration of the magnetometer in accordance with the command. The measures for the calibration of the magnetometer may include drawing a FIG. 8 with the mobile device in the air in order to calibrate the magnetometer. Other calibration methods known to one of ordinary skill in the art may be used without departing from the scope and spirit of the present disclosure. In some embodiments, a user may align the front end of the mobile device with the North Magnetic Pole after the calibration and before the rotation. In this scenario, the number 0 may also be aligned with the front end when the direction image is initially displayed and the specified position is the front end of the mobile device.

In step 305, when the mobile device receives a command from the user to stop rotating the mobile device, it sends to the server a report of a magnetometric numerical value currently detected by the magnetometer provided on the mobile device. The magnetometric numerical value is associated with the angle of rotation of the mobile device. In some embodiments, the magnetometric numerical value indicates a central angle between the specified position of the mobile device (e.g., the front end of the mobile device) and the North Magnetic Pole.

In some embodiments, when the mobile device detects that the time duration that the mobile device has stopped rotating exceeds a preset threshold, the mobile device may determine that the user has stopped rotating the mobile device and that a command to stop rotating the mobile device has been received from the user. On the other hand, when the mobile device detects that the time duration that the mobile device has stopped rotating does not exceed the preset threshold, the mobile device may determine that the user has not stopped rotating the mobile device, and that a command to stop rotating the mobile device has not been received.

In step 306, the server receives the magnetometric numerical value reported by the mobile device, and verifies it based on the numerical value in the specified interval.

For example, the server may calculate the difference between the numerical value of the specified interval and the magnetometric numerical value. If the absolute difference between the two values is less than a preset numerical value, the server may determine that the user currently entering the information is a legitimate user. If the absolute difference between the two values equals to or is greater than a preset value, the server may determine that the user currently entering the information is a possible attacker.

In some embodiments, the information entered by the user during the login procedure may include a username and a password. If the server determines that the user entering the information is legitimate in step 306, the server may proceed to verify whether the username and password match to each other. If the two do not match, the server may reject the user's request to login. If the username and password match to each other, the server may allow the user to login. If in step 306 the server determines that the user currently entering the information is a possible attacker, the server may reject the user's login request without verifying whether or not the entered username and password match to each other.

By requiring the user to rotate the mobile device to a specified position and performing verification based on a detected magnetometric numerical value, the method 300 avoids the requirement for users to input characters of verification codes, thereby improving the effectiveness of entering verification codes and enhancing the user experience.

Figure 6:
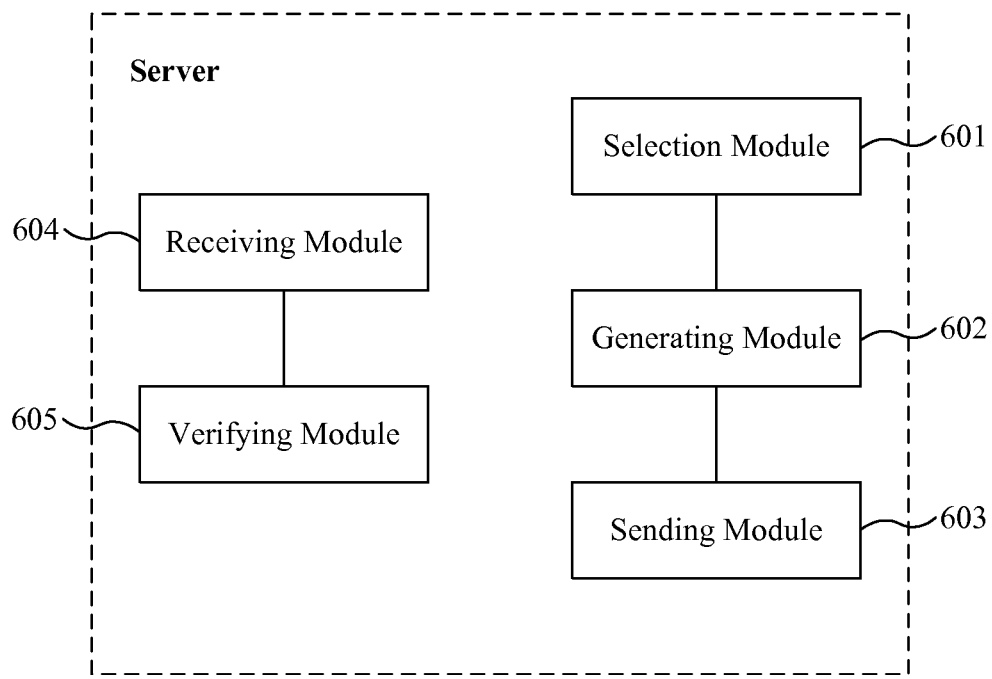
FIG. 6 is a block diagram of an exemplary server, consistent with some embodiments of this disclosure.

FIG. 6 is a block diagram of an exemplary device, for example, a server 600, consistent with some embodiments of this disclosure. Referring to FIG. 6, the server 600 includes a selection module 601, a generating module 602, a sending module 603, a receiving module 604, and a verifying module 605.

The selection module 601 is configured to select or generate a numerical value in a specified interval. The numerical value represents the central angle between a marked position and a specified position.

The generating module 602 is configured to generate a direction image using the numerical value. The North Magnetic Pole (i.e., number 0 on FIG. 4) and a marked position corresponding to the numerical value are indicated on the direction image. The number 0 points to the specified position on the mobile device when the direction image is initially displayed on the mobile device.

The sending module 603 is configured to send the direction image to the mobile device and to send a command to the mobile device for a user to rotate the mobile device.

The receiving module 604 is configured to receive, from the mobile device, a magnetometric numerical value detected by a magnetometer of the mobile device. The magnetometric numerical value is detected when the marked position indicated on the direction image aligns with the specified position. Additionally, the mobile device sends the detected magnetometric numerical value to the server when a command to stop rotating the mobile device is received from the user.

The verifying module 605 is configured to verify the received magnetometric numerical value based on the numerical value in the specified interval.

For example, the specified interval may be set as an interval of 0 to 360, and the specified position may be aligned with the North Magnetic Pole when the direction image is initially displayed on the mobile device. The central angle between the marked position and specified position may be set as the angle formed by the marked position moving in a clockwise direction towards the specified position, or by the marked position moving in a counterclockwise direction towards the specified position.

In some embodiments, the verifying module 605 may be configured to calculate the difference between the numerical value of the specified interval and the received magnetometric numerical value. If the absolute difference of the two values is less than a preset numerical value, the verifying module 605 may determine that the user currently entering the information is legitimate. If the absolute difference of the two values equals to or is greater than the preset value, the verifying module 605 may determine that the user currently entering the information is a possible attacker.

Figure 7:
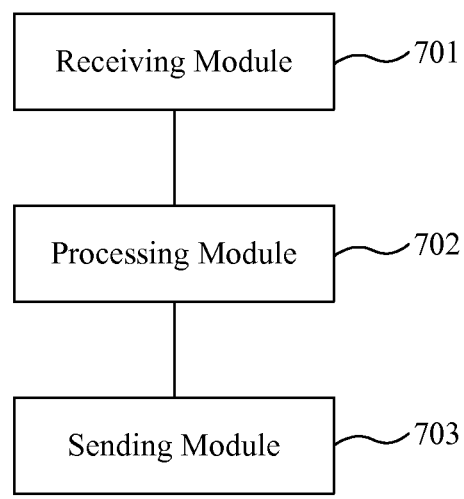
FIG. 7 is a block diagram of an exemplary mobile device, consistent with some embodiments of this disclosure.

FIG. 7 is a block diagram of an exemplary mobile device 700, consistent with some embodiments of this disclosure. Referring to FIG. 7, the mobile device 700 includes a receiving module 701, a processing module 702, and a sending module 703.

The receiving module 701 is configured to receive, from a server, a direction image and a command for a user to rotate the mobile device. The direction image is generated by the server using a numerical value in a specified interval, and is then sent to the mobile device. The direction image has a center point and is marked with a marked position corresponding to the numerical value and a reference point configured to point to a specified position on the mobile device when the direction image is initially displayed on the mobile device. The numerical value expresses a central angle between the marked position and the specified position when the direction image is initially displayed on the mobile device. In some embodiments, the reference point (e.g., number 0) is also configured to point to the North Magnetic Pole when the direction image is initially displayed on the mobile device. In this case, the reference point can be used to represent the North Magnetic Pole.

The processing module 702 is configured to rotate the direction image when it receives a command from a user who rotates the mobile device. The direction image is rotated such that the North Magnetic Pole (e.g., number 0) marked on the direction image points continually toward the North Magnetic Pole of the magnetometer provided on the mobile device. The mobile device 700 may receive a command from a user to stop rotating the mobile device when the marked position indicated on the direction image aligns with the specified position of the mobile device.

The sending module 703 is configured to report to the server a magnetometric numerical value detected by the magnetometer when the mobile device 700 receives a command from the user to stop rotating the mobile device.

In some embodiments, the processing module 702 may be configured to prompt a user to calibrate the magnetometer before rotating the direction image. The processing module 702 may also receive a command from the user to calibrate the magnetometer, and perform calibration of the magnetometer in accordance with the command.

In some embodiments, the processing module 702 may be configured to determine that a user has stopped rotating the mobile device by detecting that the time duration that the mobile device has stopped rotating has exceeded a preset threshold, and to determine that a command from the user to stop rotating the mobile device has been received. When the processing module 702 detects that the time duration that the mobile device has stopped rotating does not exceed the preset threshold, it may determine that the user has not stopped rotating the mobile device, and that the mobile device has not received a command from the user to stop rotating the mobile device.

In the above examples, the North Magnetic Pole is used as an exemplary reference point of the magnetic field of the Earth. A person having ordinary skill in the art should appreciate that other reference points of the magnetic field of the Earth can also be used. For example, the server can generate a direction image with a reference point on the direction image to point to a particular reference point of the magnetic field of the Earth before the rotation. The magnetometer of the mobile device may be configured to measure a magnetometric angle between the marked position and the reference point of the magnetic field of the Earth after the rotation. In a simple example, the reference point of the magnetic field is the North Magnetic Pole.

One of ordinary skill in the art will understand that the above described embodiments can be implemented by hardware, or software (program codes), or a combination of hardware and software. If implemented by software, it may be stored in computer-readable media. The software, when executed by a processor of the server and the mobile device can perform the disclosed methods. The computing modules/units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for verifying a user of a mobile device, comprising:
   selecting a numerical value;
   generating a direction image based on the numerical value, wherein the direction image is configured to indicate a first position on the direction image and a second position on the mobile device when the direction image is initially displayed on the mobile device, the direction image having a center point and the numerical value corresponding to a central angle between the first position and the second position;
   sending, to the mobile device, the direction image and a command, wherein the command instructs the user to rotate the mobile device such that the first position on the direction image is aligned with the second position on the mobile device, the first position being marked on the direction image by a triangle;
   receiving a magnetometric numerical value from the mobile device, wherein the magnetometric numerical value is detected by the mobile device using a magnetometer, and wherein the magnetometric numerical value indicates an angle between the second position on the mobile device and a North Magnetic Pole when the first position on the direction image is aligned with the second position on the mobile device; and determining whether to allow access of a server by the user based on the magnetometric numerical value, wherein the determination comprises:

determining a difference between the numerical value and the magnetometric numerical value; and in response to an absolute value of the difference being less than a preset threshold, allowing access of the server by the user.

2. The method of claim 1, wherein the second position is aligned with the North Magnetic Pole detected by a magnetometer of the mobile device when the direction image is initially displayed on the mobile device.

3. The method of claim 1, wherein the direction image has a reference point configured to align with a North Magnetic Pole detected by the magnetometer of the mobile device when the direction image is initially displayed on the mobile device, and the second position is aligned with the reference point when the direction image is initially displayed on the mobile device.

4. The method of claim 1, wherein the numerical value is selected within an interval from 0 to 360.

5. A method for verifying a user of a mobile device, comprising:

receiving, from a server, a direction image and a command for the user to rotate the mobile device, wherein the direction image is configured to indicate a first position on the direction image and a second position on the mobile device when the direction image is initially displayed on the mobile device, the direction image having a center point and a numerical value corresponding to a central angle between the first position and the second position, and wherein the command instructs the user to rotate the mobile device such that the first position on the direction image is aligned with the second position on the mobile device, the first position being marked on the direction image by a triangle;

rotating the direction image in response to a rotation of the mobile device by the user, wherein the direction image stays substantially stationary relative to a North Magnetic Pole detected by a magnetometer of the mobile device during the rotation;

receiving a command to stop rotating the mobile device;

detecting, using the magnetometer, a magnetometric numerical value associated with the mobile device, wherein the magnetometric numerical value indicates an angle between the second position on the mobile device and the North Magnetic Pole when the first position on the direction image is aligned with the second position on the mobile device; and sending the magnetometric numerical value to the server, wherein the magnetometric numerical value is used by the server to provide access to the user when a difference between the magnetometric numerical value and the numerical value is less than a preset threshold.

6. The method of claim 5, wherein the second position is aligned with the North Magnetic Pole detected by the magnetometer of the mobile device when the direction image is initially displayed on the mobile device.

7. The method of claim 5, wherein the direction image has a reference point configured to align with the North Magnetic Pole detected by the magnetometer of the mobile device when the direction image is initially displayed on the mobile device, and the second position is aligned with the reference point when the direction image is initially displayed on the mobile device.

8. The method of claim 5, further comprising:

performing calibration of the magnetometer of the mobile device.

9. The method of claim 5, wherein receiving a command to stop rotating the mobile device comprises:

when a time duration that the mobile device has stopped rotating exceeds a preset threshold, determining that the mobile device receives the command to stop rotating the mobile device.

10. The method of claim 5, wherein when the command to stop rotating the mobile device is received, the first position indicated on the rotated direction image aligns with the second position.

11. A device for verifying a user of a mobile device, comprising:

a selection module configured to select a numerical value;

a generating module configured to generate a direction image based on the numerical value, wherein the direction image is configured to indicate a first position on the direction image and a second position on the mobile device when the direction image is initially displayed on the mobile device, the direction image having a center point and the numerical value corresponding to a central angle between the first position and the second position;

a sending module configured to send, to the mobile device, the direction image and a command, wherein the command instructs the user to rotate the mobile device such that the first position on the direction image is aligned with the second position on the mobile device, the first position being marked on the direction image by a triangle;

a receiving module configured to receive a magnetometric numerical value from the mobile device, wherein the magnetometric numerical value is detected by the mobile device using a magnetometer, and wherein the magnetometric numerical value indicates an angle between the second position on the mobile device and a North Magnetic Pole when the first position on the direction image is aligned with the second position on the mobile device; and a verifying module configured to determine whether to allow access of a server by the user based on the magnetometric numerical value, wherein the determination comprises the verifying module being further configured to:

determine a difference between the numerical value and the magnetometric numerical value; and if an absolute value of the difference is less than a preset threshold, allow access of the server by the user.

12. The device of claim 11, wherein the second position is aligned with the North Magnetic Pole detected by a magnetometer of the mobile device when the direction image is initially displayed on the mobile device.

13. The device of claim 11, wherein the direction image has a reference point configured to align with a North Magnetic Pole detected by the magnetometer of the mobile device when the direction image is initially displayed on the mobile device, and the second position is aligned with the reference point when the direction image is initially displayed on the mobile device.

14. The device of claim 11, wherein the numerical value is within an interval from 0 to 360.

15. A device for verifying a user of a mobile device, comprising:
- a receiving module configured to receive, from a server, a direction image and a command for the user to rotate the mobile device, wherein the direction image is configured to indicate a first position on the direction image and a second position on the mobile device when the mobile device initially displays the direction image, the direction image having a center point and the numerical value corresponding to a central angle between the first position and the second position, and wherein the command instructs the user to rotate the mobile device such that the first position on the direction image is aligned with the second position on the mobile device, the first position being marked on the direction image by a triangle;
- a processing module configured to:
  - rotate the direction image in response to a rotation of the mobile device by the user, wherein the direction image stays substantially stationary relative to a North Magnetic Pole detected by a magnetometer of the mobile device during the rotation;
  - receive a command to stop rotating the mobile device; and
  - detect, using the magnetometer, a magnetometric numerical value associated with the mobile device, wherein the magnetometric numerical value indicates an angle between the second position on the mobile device and the North Magnetic Pole when the first position on the direction image is aligned with the second position on the mobile device; and
- a sending module configured to send the magnetometric numerical value to the server, wherein the magnetometric numerical value is used by the server to provide access to the user when a difference between the magnetometric numerical value and the numerical value is less than a preset threshold.

16. The device of claim 15, wherein the second position is aligned with the North Magnetic Pole detected by the magnetometer of the mobile device when the direction image is initially displayed on the mobile device.

17. The device of claim 15, wherein the processing module further configured to:
- perform calibration of the magnetometer.

18. The device of claim 15, wherein the processing module is further configured to:
- when a time duration that the mobile device has stopped rotating exceeds a preset threshold, determine that the mobile device receives the command to stop rotating the mobile device.

19. The device of claim 15, wherein when the command to stop rotating the mobile device is received, the first position indicated on the rotated direction image aligns with the second position.

20. A method for verifying a user of a mobile device, comprising:
- receiving, from a server, an instruction to rotate the mobile device such that a first position on a direction image is aligned with a second position on the mobile device, the first position being marked on the direction image by a triangle;
- rotating the mobile device according to the instruction;
- detecting a magnetometric numerical value of the mobile device relative to a reference point of the magnetic field of the Earth by a magnetometer of the mobile device, wherein the magnetometric numerical value indicates an angle between the second position on the mobile device and the reference point of the magnetic field of the Earth when the first position on the direction image is aligned with the second position on the mobile device; and
- sending the detected magnetometric numerical value to the server, wherein the magnetometric numerical value is used by the server to provide access to the user when a difference between an angle and the magnetometric numerical value is less than a preset threshold.

21. The method for of claim 20, wherein the reference point of the magnetic field of the Earth is a North Magnetic Pole detected by the magnetometer of the mobile device.

22. A method for verifying a user of a mobile device, comprising:
- sending, to the mobile device, a command for the user to rotate the mobile device such that a first position on a direction image is aligned with a second position on the mobile device, the first position being marked on the direction image by a triangle;
- receiving information indicating a magnetometric numerical value of the mobile device relative to a reference point of the magnetic field of the Earth detected by a magnetometer of the mobile device, wherein the magnetometric numerical value indicates an angle between the second position on the mobile device and the reference point of the magnetic field of the Earth when the first position on the direction image is aligned with the second position on the mobile device; and
- determining whether to allow access of a server by the user based on the magnetometric numerical value, wherein the determination comprises:
  - determining a difference between an angle and the magnetometric numerical value; and
  - in response to an absolute value of the difference being less than a preset threshold, allow access of the server by the user.

23. The method for of claim 22, wherein the reference point of the magnetic field of the Earth is a North Magnetic Pole detected by the magnetometer of the mobile device.

24. A method for verifying a user of a mobile device, comprising:
- sending, to the mobile device, a direction image having a center point and a first position and an instruction for the user to rotate the mobile device to align the first position with a second position on the mobile device, the first position being marked on the direction image by a triangle;
- receiving information indicating a magnetometric numerical value of the mobile device relative to a reference point of the magnetic field of the Earth detected by the magnetometer of the mobile device, wherein the magnetometric numerical value indicates an angle between the second position on the mobile device and the reference point of the magnetic field of the Earth when the first position on the direction image is aligned with the second position on the mobile device; and
- determining whether to allow access of a server by the user based on the magnetometric numerical value, wherein the determination comprises:
  - determining a difference between an angle and the magnetometric numerical value; and
  - in response to an absolute value of the difference being less than a preset threshold, allow access of the server by the user.

25. The method of claim 24, wherein the reference point of the magnetic field of the Earth is a North Magnetic Pole detected by the magnetometer of the mobile device.

26. The method of claim 24, wherein the direction image further comprising a reference point, which is configured to be aligned with the second position of the mobile device when the direction image is initially displayed with the mobile device.

27. The method of claim 24, wherein the second position is a front end of the mobile device.

* * * * *